UNITED STATES PATENT OFFICE.

JONAS W. AYLSWORTH, OF EAST ORANGE, NEW JERSEY, ASSIGNOR, BY MESNE ASSIGN-
MENTS, TO NEW JERSEY PATENT COMPANY, OF WEST ORANGE, NEW JERSEY, A
CORPORATION OF NEW JERSEY.

METHOD OF MOLDING SOUND-RECORDS AND OTHER OBJECTS.

1,146,390.  Specification of Letters Patent.  Patented July 13, 1915.

No Drawing. Original application filed August 26, 1910, Serial No. 579,130. Divided and this application filed November 4, 1910. Serial No. 590,602.

*To all whom it may concern:*

Be it known that I, JONAS W. AYLSWORTH, a citizen of the United States, and a resident of East Orange, in the county of Essex and State of New Jersey, have invented a certain new and useful Method of Molding Sound-Records and other Objects, of which the following is a description.

My invention relates to a process of molding sound records and other objects, the process involving the formation of a surface layer of a hard final infusible insoluble phenolic condensation product upon the object.

This application is a division of my application Serial No. 579,130, filed August 26, 1910 for Process of molding sound records and other objects.

In an application filed by me on August 26, 1910, Serial No. 579,129, entitled Method of molding objects having a refractory surface layer, upon which application U. S. Patent No. 1,094,828 has been granted, I have described a method of molding sound records and other objects by coating the surface of a mold with a solution of ingredients, which, upon being heated, form a surface layer or veneer on the mold surface of a hard infusible insoluble phenolic condensation product having the mold impression formed on the outer surface thereof. The object to be surfaced is pressed into contact with this hardened veneer in the mold, with application of heat sufficient to cause the object or mass and the surface layer to become firmly welded together, the molded object then being cooled and removed from the mold with the surface layer adhering thereto. The process claimed herein is in some instances an improvement upon the process described in my application above referred to, and is in some aspects a specific embodiment thereof.

My present process will be described in connection with sound records, although it will be obvious that it may be applied to the formation of other molded objects with equally good results.

A blank mold surface is painted with or dipped in a solution of a fusible soluble phenolic condensation product and a hardening agent therefor, such as hexa-methylene-tetra-amin, in a suitable solvent which may be either a volatile solvent, such as amyl alcohol, or a solid solvent, such as mono-nitro-naphthalene, oil of mirbane, di-nitro-beznol, and other solvents referred to in my application Serial No. 579,129, filed August 26, 1910. This coating upon the matrix may be the enamel lacquer or varnish described in my application Serial No. 543,239, filed February 11, 1910, as stated in my application Serial No. 579,129, filed August 26, 1910, above referred to, and upon which U. S. Patent No. 1,098,608 has been granted. The solvent used should be one whose boiling point is higher than the temperature at which it is desired to perform the final hardening reaction of the substance in solution into a refractory insoluble infusible condensation product.

Having coated the blank mold, the same is dried, and heated sufficiently to cause the ingredients of the coating to react to form the final infusible insoluble refractory product referred to. A blank phonograph record, which is preferably made of a phenolic condensation product or a mixture of the same with an inert filling material, is then pressed in the blank mold into contact with the surfacing layer formed in the blank mold as described, heat being applied sufficiently to cause the welding of the surface layer to the blank, and the transfer of the surface layer from the blank mold to the blank upon the cooling and withdrawal of the blank from the mold. The final hardening of the surface layer or varnish in the blank mold may be imparted to the same at the same time that the blank is expanded into contact therewith and welded thereto, it only being necessary to dry the surface coat in the blank mold before pressing the blank into contact therewith, with application of heat sufficient to cause the final reaction of the surface layer and the welding of the same to the blank. The blank record thus formed with a smooth hardened surface layer is then pressed into or against a heated record matrix, the blank also being heated if necessary. Because of the character of the surface layer of the blank and the presence therein of a plasticity component, such as described in my application Serial No.

496,060, the record is formed in the surface thereof by the matrix in much the same manner that the sound record is impressed upon a heated celluloid blank pressed into a mold. The record thus formed is cooled and withdrawn from the mold.

The process thus described is an extremely cheap and practical method of manufacture, because of the comparative cheapness of the blank molds in which the surface veneer is formed.

Having now described my invention, what I claim and desire to protect by Letters Patent is as follows:—

1. The process of molding sound records, which consists in coating a blank matrix with a solution of substances which react upon application of heat to form a final hardened phenolic condensation product which is infusible and insoluble but sufficiently plastic when heated to take a record impression, drying the same, pressing a blank into contact with the coating of the matrix with application of heat to cause the transformation of the coating by chemical action into the final product aforesaid and at the same time the transfer of the coating from the matrix to the blank, withdrawing the coated blank from the matrix and pressing the blank thus formed into a record mold with sufficient application of heat to cause the sound record to be formed on the coating of the blank, substantially as described.

2. The process of molding sound records which consists in forming upon a blank matrix a coating of substances, including a solid solvent plasticity element, which coating is adapted to be transformed chemically by heat into an infusible insoluble phenolic condensation product, which becomes sufficiently plastic on subsequent application of heat to receive a record impression, drying the coating, pressing a blank into contact with the coating with application of sufficient heat to cause the transformation of the coating into the infusible product as aforesaid, and at the same time the transfer of the coating from the matrix to the blank, and the adhesion of the coating to the blank, withdrawing the coated blank from the matrix, and pressing the coated blank thus formed into a record mold with sufficient application of heat to cause the sound record to be formed on the coating of the blank, substantially as described.

3. The process of molding sound records which consists in coating a blank matrix with ingredients which react upon application of heat to form a final hardened phenolic condensation product which is sufficiently plastic when heated to take a record impression, drying the coating, pressing a blank containing a phenolic condensation product into contact with the coating with application of heat to cause the transformation of the coating by chemical action into the final product aforesaid and at the same time the transfer of the same from the matrix to the blank, withdrawing the coated blank from the matrix, and pressing the blank thus formed into a record mold with sufficient application of heat to cause the sound record to be formed on the coating of the blank, substantially as described.

4. The process of molding sound records and other objects which consists in forming upon a blank matrix a coating of substances including a solid solvent plasticity agent, which coating is adapted to be transformed chemically by heat into hardened phenolic condensation product which becomes sufficiently plastic on subsequent application of heat to receive an impression, drying the coating, pressing a blank into contact with the coating with application of sufficient heat to cause a transformation of the coating into the hardened product as aforesaid and at the same time the transfer of the coating from the matrix to the blank, withdrawing the coated blank from the matrix, and heating the same and forming an impression therein, substantially as described.

5. The process of molding sound records and other objects which consists in forming upon a blank matrix a coating of substances including a solid solvent plasticity agent, which coating is adapted to be transformed chemically by heat into hardened phenolic condensation product which becomes sufficiently plastic on subsequent application of heat to receive an impression, drying the coating, pressing a blank into contact with the coating with application of sufficient heat to cause a transformation of the coating into the hardened product as aforesaid and at the same time the transfer of the coating from the matrix to the blank, and withdrawing the coated blank from the matrix, substantially as described.

This specification signed and witnessed this 1st day of November 1910.

JONAS W. AYLSWORTH.

Witnesses:
 DYER SMITH,
 ANNA R. KLEHM.

It is hereby certified that in Letters Patent No. 1,146,390, granted July 13, 1915, upon the application of Jonas W. Aylsworth, of East Orange, New Jersey, for an improvement in "Methods of Molding Sound-Records and Other Objects," errors appear in the printed specification requiring correction as follows: Page 1, line 57, for the word "beznol" read *benzol;* same page, line 62, after the date February 11, 1910, insert the words and numerals *and upon which U. S. Patent No. 1,098,608, has been granted,* ; same page, lines 64-65, strike out the comma and the words and numerals ", and upon which U. S. Patent No. 1,098,608, has been granted.", and line 64, after the word "to" insert a period; and that the said Letters Patent should be read with these corrections therein that the same may conform to the record of the case in the Patent Office.

Signed and sealed this 28th day of September, A. D., 1915.

[SEAL.]
J. T. NEWTON,
*Acting Commissioner of Patents.*